United States Patent
Narasimha et al.

(10) Patent No.: US 10,075,275 B2
(45) Date of Patent: Sep. 11, 2018

(54) IN-DEVICE COEXISTENCE WITH OTHER TECHNOLOGIES IN LTE LICENSE ASSISTED ACCESS OPERATION

(71) Applicant: MOTOROLA MOBILITY LLC, Chicago, IL (US)

(72) Inventors: Murali Narasimha, Vernon Hills, IL (US); Vijay Nangia, Algonquin, IL (US); Ajit Nimbalker, Buffalo Grove, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/674,493

(22) Filed: Aug. 10, 2017

(65) Prior Publication Data
US 2017/0366318 A1    Dec. 21, 2017

Related U.S. Application Data

(63) Continuation of application No. 15/008,848, filed on Jan. 28, 2016, now Pat. No. 9,762,368.

(60) Provisional application No. 62/146,210, filed on Apr. 10, 2015.

(51) Int. Cl.
*H04W 72/00* (2009.01)
*H04L 5/00* (2006.01)
*H04L 1/18* (2006.01)

(52) U.S. Cl.
CPC .......... *H04L 5/0053* (2013.01); *H04L 1/1861* (2013.01); *H04L 5/0007* (2013.01); *H04L 5/0062* (2013.01); *H04L 5/001* (2013.01); *H04L 5/0042* (2013.01); *H04L 5/0044* (2013.01)

(58) Field of Classification Search
CPC ...... H04L 5/0053; H04L 1/1861; H04L 5/001
USPC ....................... 455/450, 422.1, 434, 455, 418
See application file for complete search history.

(56) References Cited

U.S. PATENT DOCUMENTS

| | | |
|---|---|---|
| 2012/0164948 A1 | 6/2012 | Narasimha |
| 2013/0223250 A1 | 8/2013 | Matsuo |
| 2015/0098437 A1* | 4/2015 | Chen et al. ................... 370/330 |
| 2015/0110012 A1 | 4/2015 | Bhushan |
| 2015/0351115 A1* | 12/2015 | Jeon et al. .................... 455/450 |
| 2016/0183097 A1* | 6/2016 | Richards et al. ............. 455/454 |

OTHER PUBLICATIONS

LY, Notice of References Cited, PTO-892, U.S. Appl. No. 15/008,848, U.S. Patent and Trademark Office, Jul. 27, 2016.
LY, Notice of References Cited, PTO-892, U.S. Appl. No. 15/008,848, U.S. Patent and Trademark Office, Feb. 21, 2017.
Hanus, PCT International Search Report, International application No. PCT/US2016/022130, European Patent Office, Rijswijk, NL, Jun. 8, 2016.

(Continued)

*Primary Examiner* — Nghi H Ly
(74) *Attorney, Agent, or Firm* — Matthew C. Loppnow; The Watson I.P. Group, PLC

(57) ABSTRACT

Methods and structures are disclosed which facilitate co-existence of Long Term Evolution (LTE) type communication signal reception and transmission using one carrier, such as a licensed carrier, and another carrier, such as an unlicensed carrier, in the presence of other transmissions using the other carrier.

26 Claims, 8 Drawing Sheets

(56) References Cited

OTHER PUBLICATIONS

Huawei (Rapporteur): "TP for TR 36.889 v0.1.0 Study on licensed-assisted access using LTE", 3GPP Draft; R2-150727, 3rd Generation Prtnership Project (3GPP), Mobile Competence Cenre; 650, Route Des Lucioles; F-06921 Sophia-Antipolis Cedex; France, vol. RAN WG2, No. Bratislava, Slovakia; Apr. 20, 2015-Apr. 24, 2015, Feb. 27, 2015 (Feb. 27, 2015).

Ericsson: "In-device coexistence in LAA", 3GPP Draft; R2-150384—In-Device Coexistance in LAA, 3rd Generation Prtnership Project (3GPP), Mobile Competence Cenre; 650, Route Des Lucioles; F-06921 Sophia-Antipolis Cedex; France, vol. RAN WG2, No. Athens, Greece; Feb. 9, 2015-Feb. 13, 2015, Feb. 8, 2015 (Feb. 8, 2015).

\* cited by examiner

IN-DEVICE COEXISTENCE WITH OTHER TECHNOLOGIES IN LTE LICENSE ASSISTED ACCESS OPERATION

CROSS-REFERENCE TO RELATED APPLICATIONS

This application claims priority to U.S. patent application Ser. No. 15/008,848, filed on Jan. 28, 2016, which claims the benefit under 35 U.S.C. § 119(e) of U.S. Provisional Application No. 62/146210, filed on Apr. 10, 2015, which applications are hereby incorporated by reference in their entirety.

TECHNICAL FIELD

The following disclosure relates to wireless telecommunication transmissions using two different carriers. In particular, the following disclosure relates to approaches for co-existence of Long Term Evolution (LTE) type communication signal reception and transmission using one carrier, such as a licensed carrier, and another carrier, such as an unlicensed carrier, in the presence of other transmissions using the other carrier.

BACKGROUND

LTE Advanced is being considered for deployment in the unlicensed spectrum in the 5 GHz band. To do so, licensed spectrum (e.g., in the range 400 MHz to 3.8 GHz) and spectrum in unlicensed spectrum bands would be aggregated together in the same way that the licensed spectrum bands are treated in standard LTE Advanced carrier aggregation (CA). Regulatory authorities around the world have defined or are defining a wide variety of requirements so that various systems can inter-operate or coexist with incumbent users in the unlicensed bands, notably including Wi-Fi deployments.

For LTE Advanced (LTE Release 10-12) carrier aggregation (CA) or Dual Connectivity, an eNB (E-UTRAN Node B or "evolved Node-B") may be used. An eNB is connected to a mobile phone network that communicates with mobile handsets (i.e., "user equipment" or UEs) and that configures a secondary serving cell (Scell) to the UE to provide additional frequency resources (i.e., a secondary carrier or a secondary component carrier (CC)) for communication in addition to the primary serving cell (Pcell). The Scell is typically activated for a UE at the onset of a data burst transmission for the UE and deactivated after the transmission is complete. Activation is done by using an activation command MAC layer control element (MAC CE). Deactivation is done either upon expiry of a deactivation timer or by using an explicit deactivation command MAC CE. Additionally, a UE operating in an Advanced LTE (LTE Release 12) network can expect at least discovery signals from the eNB on the Scell carrier while the carrier is deactivated. After receiving an activation command for the Scell, the UE expects cell specific reference signal (CRS) transmissions from the eNB on the Scell carrier from the subframe in which the activation command is received until the subframe in which the Scell is deactivated.

For further Advanced LTE (LTE Release 13) Scell, operation on unlicensed carriers continues to be studied. The initial focus of the studies is Scell operation via a CA mechanism. However, it has been perceived that some of the procedures identified for CA can also be reused for dual connectivity (i.e., when the Scell and Pcell belong to different cell groups).

Due to regulatory requirements, and due to the need to for LTE Advanced to co-exist with other wireless systems (e.g., Wi-Fi), LTE devices (i.e., UEs and eNBs) need to take several issues into account while operating on an unlicensed carrier frequency (i.e., using License Assisted Access LTE, or "LAA LTE").

First, before transmitting on an unlicensed carrier, the LTE devices (e.g., eNB) typically have to check whether the carrier (i.e., the carrier frequency) is busy using some form of 'listen before talk' (LBT) mechanism, then an LTE device can begin transmissions only if the carrier is free. LBT typically includes measuring the energy on the carrier (sometimes referred to as sensing) for a short duration (e.g., 9 us or 20 us) and determining whether the measured energy is less than a threshold (e.g., −82 dBm or −62 dBm). If the energy is less than the threshold, the carrier is determined to be free. Some examples of LBT include the CCA-ED (clear channel assessment-energy detect) and CCA-CS (clear channel assessment-carrier sense) mechanisms defined in IEEE 802.11 specifications, and CCA mechanisms specified in ETSI EN 301 893 specification.

Second, transmissions on the carrier typically also have to follow discontinuous transmission requirements (DCT requirements), i.e., the LTE device can continuously transmit for only Xms (e.g., X=4 ms as per regulations for some regions, and up to 13 ms per regulations for other regions), after which it has to cease transmission for some duration (sometimes referred as idle period), then perform LBT, and reinitiate transmission only if the LBT procedure is successful (i.e., the LBT procedure indicates that the carrier is not busy). The device may perform LBT towards the end of the idle period.

As a result, mechanisms are needed to enable more efficient wireless network operation in both the licensed and unlicensed carrier spectrums.

BRIEF DESCRIPTION OF THE DRAWINGS

For a more complete understanding, reference is now made to the following description taken in conjunction with the accompanying Drawings in which.

DETAILED DESCRIPTION

Figure 1:
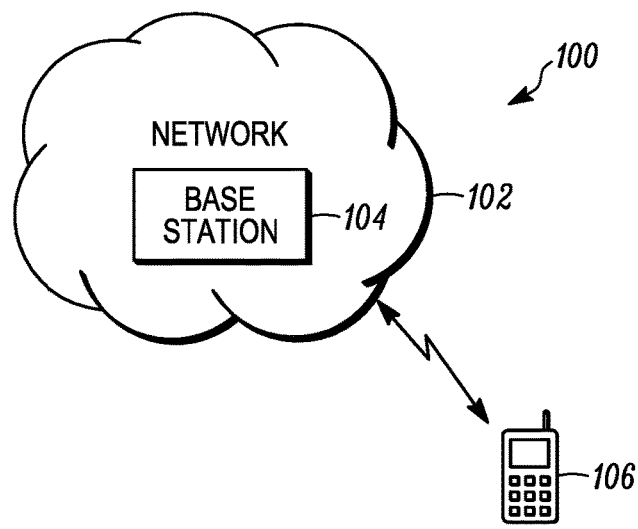
FIG. 1 illustrates a communications system in accordance with various invention embodiments.

Embodiments will now be described more fully hereinafter with reference to the accompanying drawings, in which various embodiments of the invention are shown. This invention may, however, be embodied in many different forms and should not be construed as limited to the embodiments set forth herein; rather, these embodiments are provided so that this disclosure will be thorough and complete, and will fully convey pertinent aspects of the invention to those skilled in the art.

As will be explained and discussed in more detail below, various embodiments provide enhancements or modifications to the creation and reception of LTE signals and channels in order to enable improved operation in both licensed and unlicensed frequency spectrums.

In one embodiment a method is provided for a wireless communication device to perform wireless transmissions of a first technology on a first carrier and a second technology on a second carrier. The method comprises the wireless communication device determining a need to perform a clear channel assessment (CCA) on the second carrier, the wireless communication device coordinating a wireless transmission on the first carrier with performance of the CCA on the second carrier, and the wireless communication device commencing a wireless transmission on the second carrier if the CCA on the second carrier is successful.

In some embodiments the wireless communication device is a user equipment (UE). In some embodiments the wireless communication device is a base station.

In some embodiments the coordinating comprises inhibiting wireless transmission on the first carrier during a first period, and performing a CCA on the second carrier during a second period, wherein the second period at least partly overlaps the first period. In some embodiments the method further includes the wireless communication device commencing a wireless transmission on the first carrier before performing the CCA on the second carrier, and the inhibiting comprises muting a portion of the wireless transmission on the first carrier for the first period.

In some embodiments the first period is an orthogonal frequency-division multiplexed (OFDM) symbol of the wireless transmission on the first carrier. In some embodiments the muting a portion of the wireless transmission comprises muting selected subcarriers of the wireless transmission on the first carrier. In some embodiments the muting a portion of the wireless transmission comprises muting at least a subset of subcarriers in one or more OFDM symbols of the wireless transmission on the first carrier. In some embodiments the wireless transmission on the first carrier and the wireless transmission on the second carrier at least partly overlap.

In some embodiments the wireless communication device is a user equipment (UE) and the determining a need to perform a clear channel assessment on the second carrier comprises receiving a resource allocation for transmission on the second carrier during a transmission time slot immediately following the second period. In some embodiments the wireless communication device is a base station and the determining a need to perform a clear channel assessment on the second carrier comprises receiving data for transmission to one or more UEs and scheduling the data for transmission during a transmission time slot immediately following the second period.

In some embodiments the inhibiting comprises the wireless communication device determining a first amount of time required for transmission of a first packet on the first carrier, the wireless communication device determining a time at which a CCA on the second carrier is to be performed, the wireless communication device performing a CCA on the first carrier, and the wireless communication device transmitting the first packet on the first carrier if the CCA on the first carrier is successful and if at least the first amount of time remains before the time at which the CCA on the second carrier is to be performed. In some embodiments the inhibiting further comprises the wireless communication device delaying the CCA on the first carrier if transmitting the first packet on the first carrier would overlap with performing the CCA on the second carrier. In some embodiments the method further includes the wireless communication device determining a second amount of time required for transmission of a second packet on the first carrier, and the wireless communication device transmitting the second packet on the first carrier if at least the second amount of time remains before the time at which the CCA on the second carrier is to be performed.

In some embodiments the wireless communication device is a user equipment (UE). In some embodiments the wireless communication device is a base station.

In some embodiments the inhibiting comprises the wireless communication device determining a first time duration needed for transmission of a packet on the first carrier, and a second time duration before beginning a clear channel assessment on the second carrier. The method also includes the wireless communication device performing a clear channel assessment on the first carrier. If the clear channel assessment on the first carrier is successful before the expiration of a third duration equal to the second time duration minus the first time duration, the wireless communication device transmits the packet on the first carrier. If the clear channel assessment is not successful before the expiration of the third duration, the wireless communication device delays a transmission of the packet on the first carrier at least until the clear channel assessment on the second carrier is complete.

In some embodiments, the method also includes the wireless communication device constructing two or more packets for transmission on the first carrier. The wireless communication device transmitting the packet on the first carrier may include the wireless communication device selecting a first packet from the two or more packets such that the first time duration corresponding to the first packet is no greater than the second time duration, and the wireless communication device transmitting the first packet on the first carrier.

In some embodiments the coordinating comprises the wireless communication device performing a CCA on the second carrier using a first threshold value if the wireless communication device is not simultaneously transmitting on the first carrier, and using a second threshold value if the wireless communication device is simultaneously transmitting on the first carrier.

In some embodiments the magnitude of the second threshold is greater than the magnitude of the first threshold. In some of these embodiments a difference in magnitude between the second threshold and the first threshold is dictated by a base station. In others of these embodiments a difference in magnitude between the second threshold and the first threshold is determined by the wireless communication device by measuring in-device leakage during an idle slot on the second carrier during a transmission by the wireless communication device on the first carrier.

In some embodiments the method also includes the wireless communication device measuring corresponding in-device leakage during an idle slot on the second carrier during a transmission by the wireless communication device on the first carrier, for each respective one of a plurality of first carrier frequencies, and the wireless communication device selecting the second threshold value for use during a transmission on a given first carrier frequency, based on the measured in-device leakage for the given first carrier frequency.

In another embodiment a wireless communication device (WCD) is provided that is configured to perform wireless transmissions of a first technology on a first carrier and a second technology on a second carrier. The WCD comprises a transceiver and a processor coupled to the transceiver. The WCD is operable to perform a clear channel assessment (CCA) on the first carrier, commence a wireless transmission on the first carrier if the CCA on the first carrier is successful, and determine a need to perform a CCA on the second carrier. The WCD is further operable to coordinate wireless transmission on the first carrier with performance of the CCA on the second carrier, and to commence a wireless transmission on the second carrier if the CCA on the second carrier is successful.

In some embodiments the wireless communication device is a user equipment (UE). In some embodiments the wireless communication device is a base station.

In some embodiments the operable to coordinate comprises inhibiting wireless transmission on the first carrier during a first period, and performing a CCA on the second carrier during a second period, wherein the second period at least partly overlaps the first period. In some embodiments the WCD is further operable to commence a wireless transmission on the first carrier before performing the CCA on the second carrier, and the inhibiting comprises muting a portion of the wireless transmission on the first carrier for the first period.

In some embodiments the first period is an orthogonal frequency-division multiplexed (OFDM) symbol of the wireless transmission on the first carrier. In some embodiments the muting a portion of the wireless transmission comprises muting selected subcarriers of the wireless transmission on the first carrier. In some embodiments the muting a portion of the wireless transmission comprises muting at least a subset of subcarriers in one or more OFDM symbols of the wireless transmission on the first carrier. In some embodiments the wireless transmission on the first carrier and the wireless transmission on the second carrier at least partly overlap.

In some embodiments the wireless communication device is a user equipment (UE) and the operable to determine a need to perform a clear channel assessment on the second carrier comprises receiving a resource allocation for transmission on the second carrier during a transmission time slot immediately following the second period. In some embodiments the wireless communication device is a base station and the operable to determine a need to perform a clear channel assessment on the second carrier comprises receiving data for transmission to one or more UEs and scheduling the data for transmission during a transmission time slot immediately following the second period.

In some embodiments the inhibiting comprises the wireless communication device determining a first amount of time required for transmission of a first packet on the first carrier, the wireless communication device determining a time at which a CCA on the second carrier is to be performed, the wireless communication device performing a CCA on the first carrier, and the wireless communication device transmitting the first packet on the first carrier if the CCA on the first carrier is successful and if at least the first amount of time remains before the time at which the CCA on the second carrier is to be performed. In some embodiments the inhibiting further comprises the wireless communication device delaying the CCA on the first carrier if transmitting the first packet on the first carrier would overlap with performing the CCA on the second carrier. In some embodiments the wireless communication device is further operable to determine a second amount of time required for transmission of a second packet on the first carrier, and operable to transmit the second packet on the first carrier if at least the second amount of time remains before the time at which the CCA on the second carrier is to be performed.

In some embodiments the wireless communication device is a user equipment (UE). In some embodiments the wireless communication device is a base station.

In some embodiments the inhibiting comprises the wireless communication device determining a first time duration needed for transmission of a packet on the first carrier, and a second time duration before beginning a clear channel assessment on the second carrier. If a clear channel assessment on the first carrier performed by the wireless communication device is successful before the expiration of a third duration equal to the second time duration minus the first time duration, the wireless communication device transmits the packet on the first carrier. If the clear channel assessment is not successful before the expiration of the third duration, the wireless communication device delays a transmission of the packet on the first carrier at least until the clear channel assessment on the second carrier is complete.

In some embodiments, the wireless communication device is also operable to construct two or more packets for transmission on the first carrier. The wireless communication device transmitting the packet on the first carrier may include the wireless communication device selecting a first packet from the two or more packets such that the first time duration corresponding to the first packet is no greater than the second time duration, and the wireless communication device transmitting the first packet on the first carrier.

In some embodiments the operable to coordinate comprises the wireless communication device being operable to perform a CCA on the second carrier using a first threshold value if the wireless communication device is not simultaneously transmitting on the first carrier, and using a second threshold value if the wireless communication device is simultaneously transmitting on the first carrier.

In some embodiments the magnitude of the second threshold is greater than the magnitude of the first threshold. In some of these embodiments a difference in magnitude between the second threshold and the first threshold is dictated by a base station. In others of these embodiments a difference in magnitude between the second threshold and the first threshold is determined by the wireless communication device by measuring in-device leakage during an idle slot on the second carrier during a transmission by the wireless communication device on the first carrier.

In some embodiments the wireless communication device may be operable to measure corresponding in-device leakage during an idle slot on the second carrier during a transmission by the wireless communication device on the first carrier, for each respective one of a plurality of first carrier frequencies, and further operable to select the second threshold value for use during a transmission on a given first carrier frequency, based on the measured in-device leakage for the given first carrier frequency.

In another embodiment a method is provided for a UE to perform wireless transmissions of a first technology on a first carrier and a second technology on a second carrier. The method includes the UE detecting base stations for the second carrier, and the UE commencing a wireless transmission on the first carrier to a first base station. The method also includes the UE performing a clear channel assessment on the second carrier, which clear channel assessment overlaps the wireless transmission on the first carrier. The UE then commences a wireless transmission on the second carrier to a second base station if (a) the clear channel assessment was successful, or (b) the clear channel assessment was unsuccessful, and no other base stations on the second carrier are detected except the second base station.

In some embodiments the detecting further includes the UE receiving neighbor list information transmitted by a base station, which neighbor list information indicates base stations currently operating on the second carrier.

In another embodiment a user equipment (UE) is provided that is configured to perform wireless transmissions of a first technology on a first carrier and a second technology on a second carrier. The UE comprises a transceiver and a processor coupled to the transceiver. The UE is operable to detect base stations for the second carrier, and to commence a wireless transmission on the first carrier to a first base station. The UE is further operable to perform a clear channel assessment on the second carrier, which CCA overlaps the wireless transmission on the first carrier, and to commence a wireless transmission on the second carrier to a second base station if (a) the CCA on the second carrier was successful, or (b) the CCA on the second carrier was unsuccessful, and no other base stations on the second carrier are detected except the second base station. In some embodiments the UE receives neighbor list information transmitted by a base station. The neighbor list information indicates base stations currently operating on the second carrier.

In another embodiment a method is provided for a base station to coordinate transmissions by a user equipment (UE). The method includes the base station scheduling an uplink transmission in a first subframe by sending an uplink resource grant to the UE, and the base station performing a clear channel assessment prior to the start of the scheduled uplink transmission. If the clear channel assessment is successful, the base station transmits a channel clear signal to the UE prior to the start of the scheduled uplink transmission, and the base station receives the scheduled uplink transmission from the UE.

In some embodiments the clear channel assessment is performed, and the channel clear signal is transmitted, if at all, within a contiguous period during a final OFDM symbol of a subframe preceding the first subframe. In some embodiments the contiguous period overlaps the first OFDM symbol of the first subframe.

In another embodiment a base station is provided which is configured for coordinating transmissions by a user equipment (UE). The base station comprises a transceiver and a processor coupled to the transceiver. The base station is operable to schedule an uplink transmission in a first subframe by sending an uplink resource grant to the UE, and further operable to perform a clear channel assessment (CCA) prior to the start of the scheduled uplink transmission. The base station is further operable to transmit, if the CCA is successful, a channel clear signal to the UE prior to the start of the scheduled uplink transmission, and to receive the scheduled uplink transmission from the UE.

In some embodiments the clear channel assessment is performed, and the channel clear signal is transmitted, if at all, within a contiguous period during a final OFDM symbol of a subframe preceding the first subframe. In some embodiments the contiguous period overlaps the first OFDM symbol of the first subframe.

In another embodiment a method is provided for a user equipment (UE) to perform transmissions to a base station on a first frequency. The method comprises the UE receiving an indication from the base station to transmit on the first frequency in a first subframe, and the UE listening to detect a clear channel signal transmitted by the base station before the first subframe. The method further includes the UE performing a transmission on the first frequency in the first subframe if the clear channel signal transmitted by the base station is detected, and delaying the transmission if the clear channel signal is not detected.

In some embodiments the receiving an indication from the base station to transmit on the first frequency in the first subframe comprises receiving from the base station a resource allocation for transmission on the first frequency in the first subframe. In some embodiments the time duration between receiving the indication and the beginning of the transmission is multiple subframes longer than the time duration between receiving the clear channel signal and the beginning of the transmission.

In another embodiment a user equipment (UE) is provided which is configured to perform transmissions to a base station on a first frequency. The UE comprises a transceiver and a processor coupled to the transceiver. The UE is operable to receive an indication from the base station to transmit on the first frequency in a first subframe, and operable to listen to detect a clear channel signal transmitted by the base station before the first subframe. The UE is further operable to perform a transmission on the first frequency in the first subframe if the clear channel signal transmitted by the base station is detected, and operable to delay the transmission if the clear channel signal is not detected.

In some embodiments the UE being operable to receive an indication from the base station to transmit on the first frequency in the first subframe comprises receiving from the base station a resource allocation for transmission on the first frequency in the first subframe. In some embodiments the time duration between receiving the indication and the beginning of the transmission is multiple subframes longer than the time duration between receiving the clear channel signal and the beginning of the transmission.

In another embodiment a method is provided for a UE to perform wireless transmissions of a first technology on a first carrier and a second technology on a second carrier. The method includes the UE selecting a Reference Signal Receive Power (RSRP) threshold for a signal received from a base station on the second carrier. The RSRP threshold for the second carrier corresponds to a minimum measured power level sufficient to cause failure of a clear channel assessment (CCA) on the first carrier. The method also includes the UE determining whether an RSRP signal received from a given base station on the second carrier exceeds the RSRP threshold, and if the received RSRP signal does not exceed the RSRP threshold, the UE communicating a network request to forego transmission of at least some data signals from the given base station to the UE.

In some embodiments the at least some data signals comprise license assisted access downlink (LAA DL) signals from the given base station to the UE. In some embodiments the method also includes the UE delaying the CCA on the first carrier if the received RSRP signal is lower than the RSRP threshold. In some embodiments the RSRP threshold is selected in real time based upon correlation between RSRP measurements and CCA measurements.

In another embodiment a user equipment (UE) is provided which is configured to perform wireless transmissions of a first technology on a first carrier and a second technology on a second carrier. The UE comprises a transceiver and a processor coupled to the transceiver. The UE is operable to select a Reference Signal Receive Power (RSRP) threshold for a signal received from a base station on the second carrier. The RSRP threshold for the second carrier corresponds to a minimum measured power level sufficient to cause failure of a clear channel assessment (CCA) on the first carrier. The UE is further operable to determine whether an RSRP signal received from a given base station on the second carrier exceeds the RSRP threshold, and operable to communicate, if the received RSRP signal does not exceed the RSRP threshold, a network request to forego transmission of at least some data signals from the given base station to the UE.

In some embodiments the at least some data signals comprise license assisted access downlink (LAA DL) signals from the given base station to the UE. In some embodiments the UE is further operable to delay a CCA on the first carrier if the received RSRP signal is lower than the RSRP threshold. In some embodiments the said RSRP threshold is selected in real time based upon correlation between RSRP measurements and CCA measurements.

In another embodiment a method is provided for a base station to coordinate wireless transmissions of a first technology on a first carrier and a second technology on a second carrier. The method comprises transmitting, by a base station on the second carrier, a Reference Signal Receive Power (RSRP) signal to a given user equipment (UE). The method further comprises receiving, by the base station on the second carrier, a network request from the given UE to forego transmission of at least some data signals to the given UE if the RSRP signal does not exceed a RSRP threshold for the second carrier that corresponds to a minimum measured power level sufficient to cause failure of a clear channel assessment (CCA) by the UE on the first carrier. In some embodiments the at least some data signals comprise license assisted access downlink (LAA DL) signals from the base station to the given UE.

In another embodiment a base station is provided which is configured to coordinate wireless transmissions of a first technology on a first carrier and a second technology on a second carrier. The base station comprises a transceiver and a processor coupled to the transceiver. The base station is operable to transmit, on the second carrier, a Reference Signal Receive Power (RSRP) signal to a given user equipment (UE), and to receive, on the second carrier, a network request from the given UE to forego transmission of at least some data signals to the given UE if the RSRP signal does not exceed a RSRP threshold for the second carrier that corresponds to a minimum measured power level sufficient to cause failure of a clear channel assessment (CCA) by the UE on the first carrier. In some embodiments the at least some data signals comprise license assisted access downlink (LAA DL) signals from the base station to the given UE.

In another embodiment a method is provided for a user equipment (UE) to perform wireless transmissions of a first technology on a first carrier and a second technology on the first carrier. The method comprises the UE cooperatively using a clear channel assessment (CCA) mechanism appropriate for the first technology and a CCA mechanism appropriate for the second technology. In some embodiments such cooperation may include the UE determining which CCA mechanism has more stringent requirements, and performing a CCA on the first carrier using the CCA mechanism having more stringent requirements. If such CCA is successful, the UE may consider the other CCA having less stringent requirements to also be successful. In some embodiments, the CCA mechanism appropriate for the first technology and the CCA mechanism appropriate for the second technology are both based upon carrier-sense. If a CCA is performed for one of the first and second technology and is successful, the UE may consider as successful, without actually performing, a CCA for the other one of the first and second technology. In some embodiments, the CCA mechanism appropriate for the first technology and the CCA mechanism appropriate for the second technology are both based upon energy detection, and the CCA mechanism that has a lower energy threshold has the more stringent requirement.

In some embodiments such cooperation may include delaying a CCA for the first technology in response to a receiving a resource allocation signal from a base station for scheduling for an uplink transmission of the second technology by another UE.

In another embodiment a method is provided for a UE to perform wireless transmissions of a first technology on a first carrier and a second technology on a second carrier. The method comprises the UE commencing a wireless transmission on the first carrier. The UE determines a need to perform a clear channel assessment on the second carrier, and mutes a portion of the wireless transmission on the first carrier for a first period based on the need to perform a clear channel assessment on the second carrier. The method further includes the UE performing a clear channel assessment on the second carrier during a second period that at least partly overlaps the first period, and the UE commencing a wireless transmission on the second carrier based on a successful result of the clear channel assessment.

In some embodiments the first period is an OFDM symbol of the wireless transmission on the first carrier. In some embodiments the muting a portion of the wireless transmission comprises muting selected subcarriers of the transmission on the first carrier. In some embodiments the muting a portion of the wireless transmission comprises muting at least a subset of subcarriers in one or more OFDM symbols of the wireless transmission on the first carrier. In some embodiments the wireless transmission on the first carrier and the wireless transmission on the second carrier at least partly overlap.

In another embodiment a user equipment (UE) is provided that is configured to perform wireless transmissions of a first technology on a first carrier and a second technology on a second carrier. The UE comprises a transceiver and a processor coupled to the transceiver. The UE is operable to commence a wireless transmission on the first carrier, and determine a need to perform a clear channel assessment on the second carrier. The UE is further operable to mute a portion of the wireless transmission on the first carrier for a first period based on the need to perform a clear channel assessment on the second carrier, perform a clear channel assessment on the second carrier during a second period that at least partly overlaps the first period, and commence a wireless transmission on the second carrier based on a successful result of the clear channel assessment.

In some embodiments the first period is an OFDM symbol of the wireless transmission on the first carrier. In some embodiments the portion of the wireless transmission on the first carrier comprises selected subcarriers of the transmission on the first carrier. In some embodiments the portion of the wireless transmission on the first carrier comprises at least a subset of subcarriers in one or more OFDM symbols of the wireless transmission on the first carrier. In some embodiments the wireless transmission on the first carrier and the wireless transmission on the second carrier at least partly overlap.

In another embodiment a method is provided for a UE to perform wireless transmissions of a first technology on a first carrier and a second technology on a second carrier. The method comprises the UE determining a first time duration needed for transmission of a packet on the first carrier, and a second time duration before beginning a clear channel assessment on the second carrier. The method also includes the UE performing a clear channel assessment on the first carrier. If the clear channel assessment on the first carrier is successful before the expiration of a third duration equal to the second time duration minus the first time duration, the UE transmits the packet on the first carrier. If the clear channel assessment is not successful before the expiration of the third duration, the UE delays a transmission of the packet on the first carrier at least until the clear channel assessment on the second carrier is complete.

In some embodiments, the method also includes the UE constructing two or more packets for transmission on the first carrier. The UE transmitting the packet on the first carrier may include the UE selecting a first packet from the two or more packets such that the first time duration corresponding to the first packet is no greater than the second time duration, and the UE transmitting the first packet on the first carrier.

In another embodiment a method is provided for a UE to perform wireless transmissions of a first technology on a first carrier and a second technology on a second carrier. The method includes (a) the UE acquiring a first amount of time required for transmission of a first packet on the first carrier, (b) the UE determining a time at which a clear channel assessment procedure is to be performed on the second carrier, and (c) the UE adjusting a clear channel assessment procedure on the first carrier based on (a) and (b).

In some embodiments the adjusting the clear channel assessment procedure on the first carrier includes the UE performing a clear channel assessment on the first carrier and transmitting the first packet prior to performing the clear channel assessment procedure on the second carrier, and the UE delaying the clear channel assessment on the first carrier if transmitting the first packet on the first carrier would overlap with performing the clear channel assessment procedure on the second carrier.

In some embodiments the method also includes acquiring a second amount of time required for transmission of a second packet on the first carrier, and the UE further adjusting the clear channel assessment procedure on the first carrier based on the second amount of time. In some of these embodiments the adjusting the clear channel assessment procedure on the first carrier includes the UE performing a clear channel assessment on the first carrier and transmitting the first packet or the second packet prior to performing the clear channel assessment procedure on the second carrier.

In another embodiment a method is provided for a UE to perform wireless transmissions of a first technology on a first carrier and a second technology on a second carrier. The method includes the UE determining a need to perform a clear channel assessment on the second carrier, and the UE performing a clear channel assessment on the second carrier using a first threshold value if the UE is not simultaneously transmitting on the first carrier, and using a second threshold value if the UE is simultaneously transmitting on the first carrier. The method further includes the UE commencing a wireless transmission on the second carrier if the clear channel assessment is successful.

In some embodiments the magnitude of the second threshold is greater than the magnitude of the first threshold. In some of these embodiments a difference in magnitude between the second threshold and the first threshold is determined by the UE by measuring in-device leakage during an idle slot on the second carrier during a transmission by the UE on the first carrier. In others of these embodiments a difference in magnitude between the second threshold and the first threshold is dictated by a base station.

In some embodiments the method also includes the UE measuring corresponding in-device leakage during an idle slot on the second carrier during a transmission by the UE on the first carrier, for each respective one of a plurality of first carrier frequencies, and selecting the second threshold value for use during a transmission on a given first carrier frequency, based on the measured in-device leakage for the given first carrier frequency.

FIG. 1 illustrates a communication system 100 including a network 102, a base station 104, such as an eNB, and a user equipment (UE) 106. The base station may also be referred to as a base unit, an access point (AP), access terminal (AT), Node-B (NB), enhanced Node-B (eNB), relay node, home eNB, pico eNB, femto eNB or by other present or future terminology used in the art for a base station derivation. Various communication devices may exchange data or information through the network 102. The network 102 may be an evolved universal terrestrial radio access (E-UTRA) or other type of telecommunication network. A network entity, such as the base station 104, may assign a UE identifier (UEID) to the UE 106 when the UE 106 first joins the network 102. For one embodiment, the base station 104 may be a distributed set of servers in the network 102. The UE 106 may be one of several types of handheld or mobile communication devices, such as, a mobile phone, a laptop, or a personal digital assistant (PDA). In one embodiment, the UE 106 may be a wireless local area network capable device, a wireless wide area network capable device, or any other wireless device.

Figure 2:
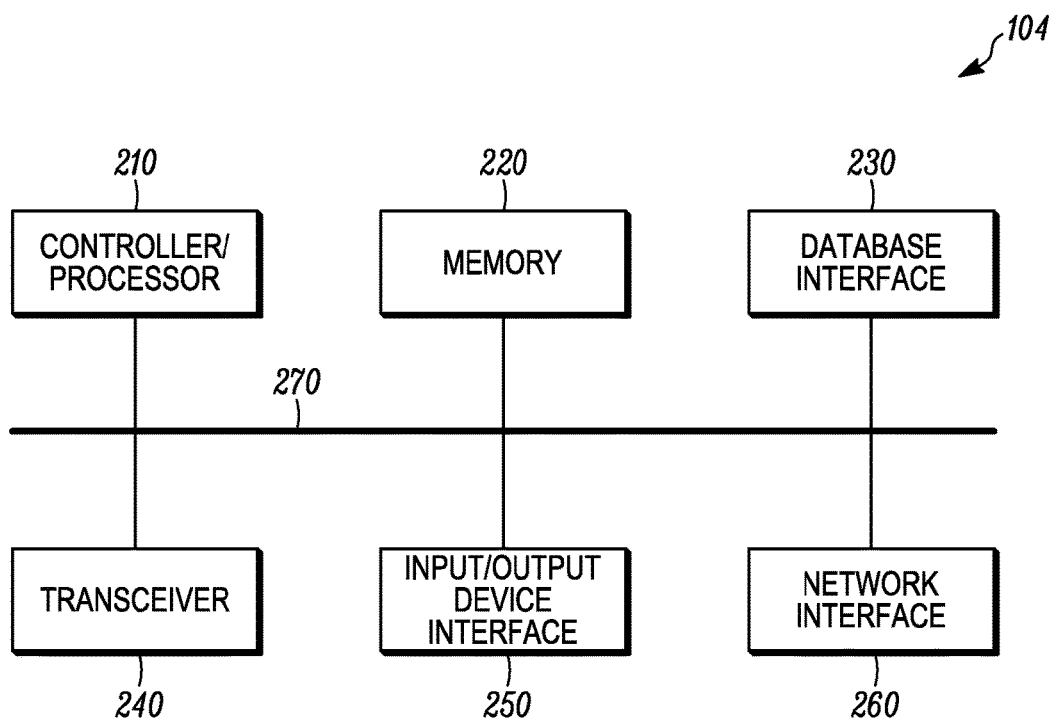
FIG. 2 illustrates a possible configuration of a computing system to act as a base station.

FIG. 2 illustrates a possible configuration of a computing system to act as the base station 104. The base station 104 may include a processor/controller 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The controller/processor 210 may be any programmable processor. Various embodiments of the disclosure may also be implemented or partially implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, solid state drive or other removable memory device that allows media content to be directly uploaded into the system. Data may be stored in the memory 220 or in a separate database (not specifically shown). The database interface 230 may be used by the controller/processor 210 to access the database. The database may contain any formatting data to connect the UE 106 to the network 102. The transceiver 240 may create a data connection with the UE 106. The transceiver 240 may configure a Physical Downlink Control Channel (PDCCH) and a Physical Uplink Control Channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present disclosure. The base station 104 may implement any operating system, such as Microsoft Windows®, LINUX, or UNIX, for example.

Client and server software may be written in any programming language, such as C, C++, Java, or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
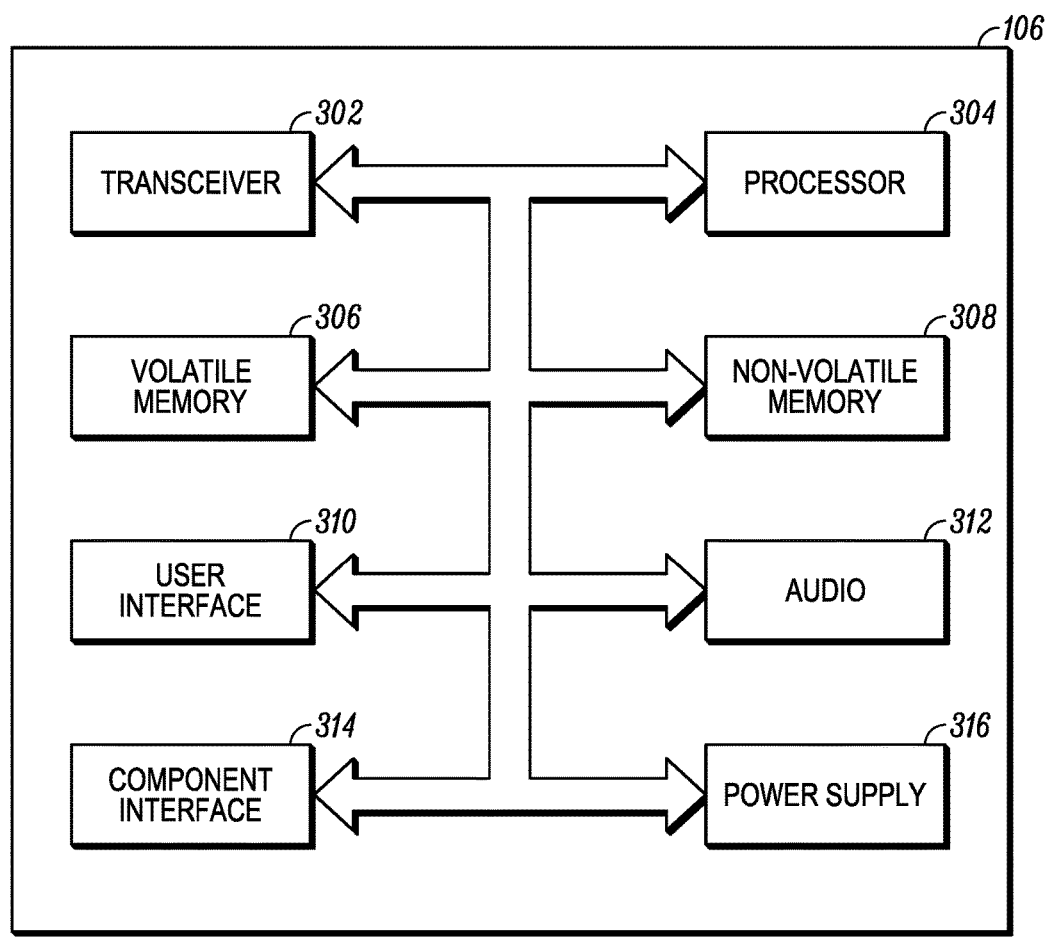
FIG. 3 is a block diagram of an embodiment of a telecommunication apparatus or electronic device that operates as a User Equipment (UE)

FIG. 3 illustrates in a block diagram of one embodiment of a telecommunication apparatus or electronic device to act as the UE 106. The UE 106 may be capable of accessing the information or data stored in the network 102. For some embodiments of the disclosure, the UE 106 may also support one or more applications for performing various communications with the network 102. The UE 106 may be a handheld device, such as, a mobile phone, a laptop, a personal digital assistant (PDA) smart phone or other multi-function communication device. For some embodiments, the UE 106 may be a Wi-Fi capable device, which may be used to access the network 102 for data or by voice using VOIP and Wi-Fi carrier frequency spectrums.

The UE 106 may include a transceiver 302, which is capable of sending and receiving data over the network 102. The UE 106 may include a processor 304 that executes stored programs or applications that may, among other things, monitor, control and interact with the other components of the UE 106. The UE 106 may also include a volatile memory 306 and a non-volatile memory 308 which are used by the processor 304. The UE 106 may include a user interface 310 that may comprise user input elements such as a keypad, display, touch screen, and the like. The user interface 310 may also include user output elements that may comprise a display screen and/or vibration and illumination indicators. The UE 106 may also include an audio interface 312 that may comprise elements such as a microphone, earphone, and speaker. The UE 106 also may include a component interface 314 to which additional elements may be attached, for example, a universal serial bus (USB) interface. The UE 106 may include a power supply 316. In addition, the UE 106 may be incorporated as a peripheral or integral part of a larger system such as a transportation vehicle, building, entertainment center, kiosk, or gaming device, to name a few.

In Long Term Evolution (LTE) communication systems, physical layer signals and channels (e.g., a control channel like a physical downlink control channel (PDCCH), enhanced physical downlink channel (EPDCCH); a data channel like a physical downlink shared channel (PDSCH); reference and synchronization signals like a primary synchronization signal (PSS), secondary synchronization signal (SSS), cell-specific reference signal (CRS), channel state information reference signal (CSI-RS), and discovery signals) are transmitted by a base station 104 using orthogonal frequency-division multiplexed (OFDM) symbols. For normal cyclic prefix (CP) operation, the OFDM symbols are of ~71 us in duration. Seven OFDM symbols may comprise a 0.5 ms slot and two slots may comprise a 1 ms LTE subframe. Therefore, an example of an LTE subframe comprises 14 OFDM symbols. The PDCCH carries resource assignment information for UEs, which is usually contained in the downlink control information (DCI) message. Multiple PDCCHs can be transmitted in a same subframe using Control Channel Elements (CCE), each of which can be nine sets of four resource elements known as Resource Element Groups (REG), which may be distributed across the first 1 to 3 symbols of a subframe or slot within a subframe. For the uplink, Single Carrier Frequency Division Multiple Access (SC-FDMA) or Discrete Fourier Transform Spread OFDM (DFT-SOFDM) is used and the subframe duration is similar to downlink (i.e. 1 ms) and a subframe contains 14 DFT-SOFDM symbols (or referred to as 14 OFDM symbols for brevity). The uplink data and/or control is carried on the physical uplink shared channel (PUSCH). Other channels for uplink transmissions include the physical uplink control channel (PUCCH), physical random access channel (PRACH), and uplink signals include sounding reference symbol (SRS) and uplink demodulation reference signal (DMRS) for demodulating uplink channels.

In-Device Coexistence Issues

As mentioned above, LTE devices (i.e., UEs and eNBs) operating on an unlicensed carrier frequency must co-exist with other wireless systems (e.g., Wi-Fi). Thus, an LTE device typically has to check whether the carrier (i.e., the carrier frequency) is busy using some form of 'listen before talk' (LBT) mechanism, then the LTE device can begin transmissions only if the carrier is free. In addition, the LTE device can continuously transmit for only a certain duration, after which it has to cease transmission for an idle period, perform another LBT, and then reinitiate transmission only if LBT is successful. LBT can be performed using a carrier sense mechanism such as Clear Channel Assessment (CCA). LBT and CCA are used interchangeably in this disclosure.

Previous studies on "In-device Coexistence" have shown how transmission on one frequency can impair reception on another frequency. Referring now to FIG. 4, consider two frequencies F1 and F2 such that if UE is transmitting on F1 it is not able to receive on F2 due to self-desense (i.e., spurious signals from the transmitter on F1 being received by the receiver on F2 thereby impacting receiver sensitivity performance). F1 and F2 may be adjacent frequencies in the 5 GHz band, or F1 and F2 may be such that harmonics of frequencies within the F1 range fall within the F2 range (i.e., F1 and F2 having harmonic relationship), causing interference. It may also be the case that F1 in combination with a third frequency F3 causes an intermodulation product that causes interference with F2.

However, if we assume that F1 is a Wi-Fi carrier and F2 is an LAA (License Assisted Access) LTE carrier in unlicensed spectrum that allows LAA LTE uplink (UL) transmission, such LTE UL transmission by the UE and Wi-Fi transmission by the UE can in principle be performed simultaneously. But such LAA UL transmissions by the UE on F2 can only be performed when the UE determines that the channel is free, which requires the UE to perform a CCA operation on F2. The UE then performs the LAA UL transmission only if the CCA operation succeeds.

Figure 4A:
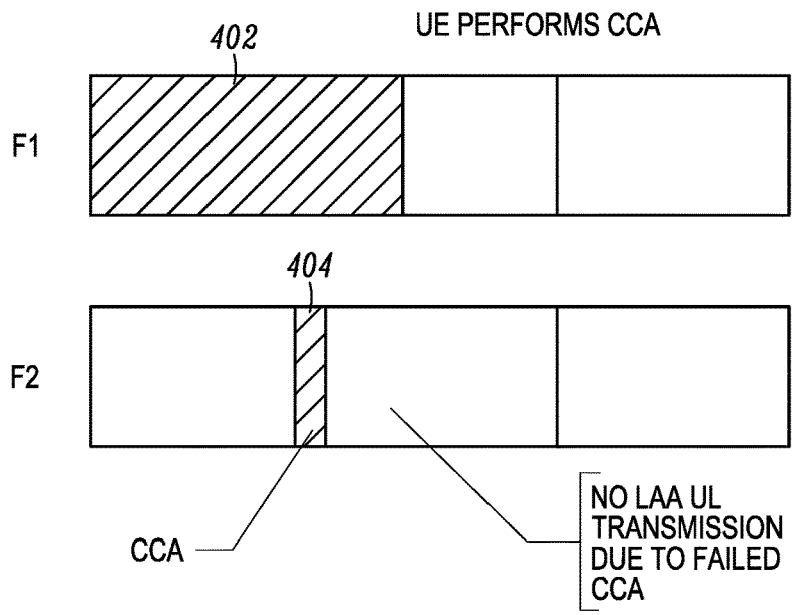
FIG. 4A illustrates a case in which transmission by a UE on one frequency is impaired by its transmission on another frequency.

In this case however, transmission on the second frequency (F2) is impaired by transmission 402 on the first frequency (F1) because the CCA 404 is unsuccessful due to the impaired reception on F2 while transmission 402 occurs on F1 (i.e., spurious transmission on F1 being received on F2 resulting in CCA 404 on F2 being unsuccessful even in scenarios when there is no transmission occurring on F2). In other words, because the UE cannot properly receive on F2 (i.e., to perform the CCA 404 on F2), it therefore cannot transmit on F2 either. Such a failed CCA 404 procedure is shown in FIG. 4A. In contrast, if the UE were to not perform a CCA on F2, it would successfully perform the LAA UL transmission 406, as shown in FIG. 4B.

Figure 4B:
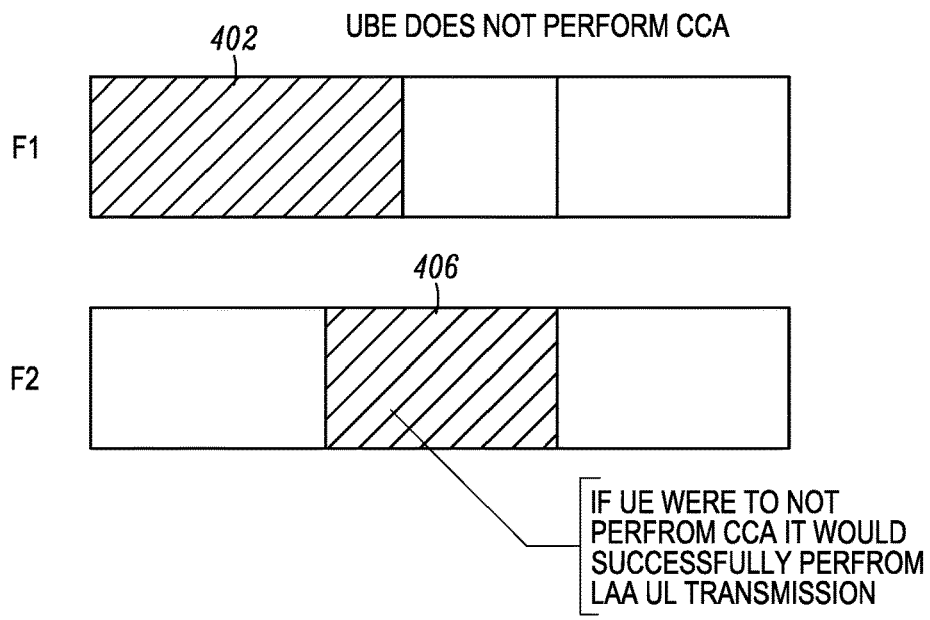
FIG. 4B illustrates transmission by a UE on one frequency and possible transmission on another frequency if no clear channel assessment needed to be performed.

While this discussion assumes that F1 shown in FIGS. 4A, 4B is a Wi-Fi carrier, it should be appreciated that the F1 may also represent another LTE carrier (e.g. another LAA carrier), frequencies being used by other unlicensed technologies (e.g., Bluetooth), and need not be viewed as only representing a Wi-Fi carrier.

Is should be noted that LAA LTE generally uses the LTE timing and frame structure. This structure implies that uplink data transmissions are scheduled by the eNB using a control channel, and the eNB allocates the time-frequency resources for the uplink transmission. This structure also implies that uplink data transmissions span an entire subframe or a portion of the subframe (e.g., in case the last symbol of the subframe is reserved for LBT or for SRS transmission by the same/different UE). The UE can only start uplink transmissions at the start of a subframe.

The UE must perform a successful CCA operation prior to its uplink transmission. If the CCA fails, then the subframe cannot be used for uplink transmission by the UE, and the UE has to await another uplink grant. The CCA period would need to be a short time window (contained within approximately one LTE OFDM symbol) prior to or just after the start of the subframe. Thus, if F1 is a Wi-Fi carrier with a lot of activity and the UE is performing frequent Wi-Fi transmissions on F1, utilization of F2 for LAA LTE is significantly impacted.

While FIGS. 4A, 4B illustrate the problem in the context of a UE, the problem can be more serious at an access point. Increasingly the industry is moving towards access points that house both an LTE eNB and a Wi-Fi access point. LAA eNBs are expected to be physically small (due to low transmit power limits and the need to place them indoors and close to a large number of devices). Such access points may not have adequate RF isolation between the LTE LAA and the Wi-Fi modules. Then, if the access point is transmitting data over Wi-Fi to any device on F1, its ability to transmit LTE LAA data on F2 to any UE is restricted (i.e., CCA 404 fails on F2 as shown above).

Another scenario is an LAA eNB operating two or more LAA carriers such that transmitting on one or more of the carriers causes in-device interference on the other carriers. Such LAA eNBs may not have adequate RF isolation between the RF elements corresponding to the frequencies. Then, if the LAA eNB is transmitting LTE LAA signals on F1 to any UE, its ability to transmit LTE LAA signals on F2 to any UE is restricted (i.e., CCA 404 fails on F2 as shown above).

Other in-device Coexistence Issues—Partial Overlap with Wi-Fi Carrier

Due to the carrier frequency arrangement in the 5 GHz unlicensed band and the bandwidths used, it is possible that a Wi-Fi carrier partially overlaps a LTE LAA carrier in certain frequency ranges. This may result in Wi-Fi transmissions by the UE causing in-device interference to downlink reception on the LTE LAA carrier. While there are some solutions for the case where Wi-Fi transmission on F1 causes in-device interference to LTE reception on F2, these solutions tend to be complex. It is desirable to have a more flexible method to handle the case where F1 and F2 have a partial overlap.

LTE Release 11 included solutions for scenarios where transmission on F1 disrupts reception on F2. When F1 is LTE, F2 is Wi-Fi, and when F1 is Wi-Fi, F2 is LTE. Certain techniques have been considered for the case when the LTE operation is occurring on a licensed carrier where the operator (e.g. cellular operator owning exclusive license to use the spectrum in a geographical area) has complete control over the medium access (e.g. frequency spectrum) on which the LTE operation is being performed. Some of these techniques are:

1. Time-division multiplexing (TDM) patterns between LTE operating on a licensed carrier and Wi-Fi so that LTE and Wi-Fi activity at a UE occur in mutually exclusive time periods. The UE provides relevant information to help the eNB determine the time partition between LTE and Wi-Fi (e.g., DRX information, desired subframe pattern).
2. Providing measured information and information related to in-device interference, so that the LTE eNB can move the UE to a different licensed LTE carrier. The information provided by the UE to the network includes impacted licensed LTE frequencies and the direction of impact.
3. Signaling CQI out-of-range for licensed LTE carrier when Wi-Fi transmission is ongoing, to ensure eNB does not transmit downlink (DL) to UE.
4. Signaling an RSRP threshold for licensed LTE carrier by the UE to the network, such that if the RSRP reported by the UE falls below the threshold, the network should not schedule UL transmission on that licensed LTE carrier for the UE.
5. Autonomously dropping some UL transmissions on a licensed LTE carrier by the UE to avoid impacting Wi-Fi reception.

Notwithstanding these enumerated techniques, additional improvements for in-device coexistence are desired. Described below are several embodiments for generally improving in-device coexistence which are useful for improving network operation in both the licensed and unlicensed carrier spectrums.

Embodiment 1

Figure 5:
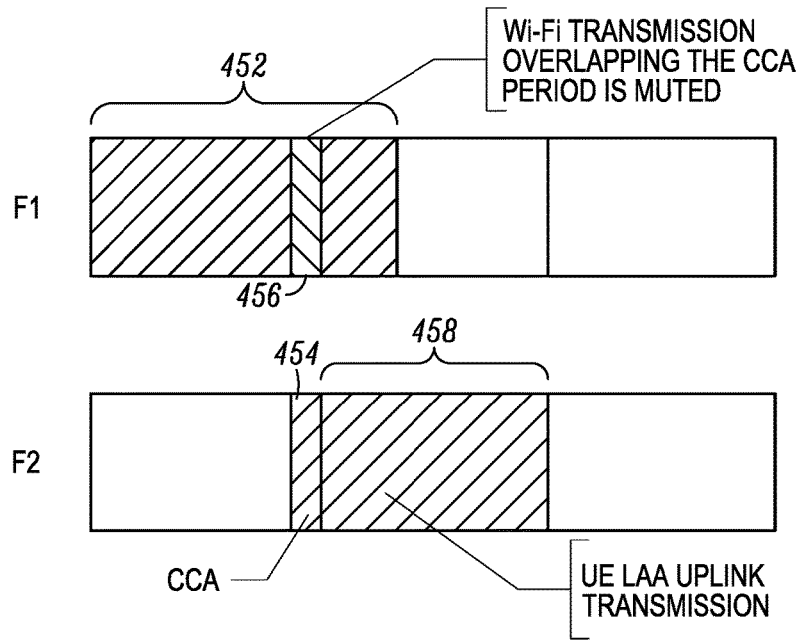
FIG. 5 illustrates an embodiment in which transmission on one frequency is muted when performing a clear channel assessment on another frequency.

Referring now to FIG. 5, a first embodiment may be seen as an example of coordinating a wireless transmission on the first carrier with performance of the CCA on the second carrier. The first embodiment generally involves muting symbols on F1 that overlap the CCA duration on F2. The wireless communication device (here shown as a UE) determines the time period when CCA 454 has to be performed on the LAA carrier F2. If there is a Wi-Fi transmission 452 on F1 ongoing at the time of the CCA 454 on F2, the device mutes Wi-Fi transmission 456 (e.g., OFDM symbols) on F1 that overlap the CCA 454 duration. This enables the device to perform CCA 454 and detect any transmissions from other devices on F2. If no ongoing transmissions on F2 are found by the CCA 454 procedure, the device can transmit 458 on F2. The muting period has to be such that the device does not lose the Wi-Fi carrier to another UE waiting for operation on F1. Such muting may be seen as an example of inhibiting wireless transmission on F1 when performing a CCA on F2, and such inhibiting may be seen as an example of coordinating a wireless transmission on F1 with performance of the CCA on F2. The wireless transmission on F1 may be inhibited for the entire period during which the CCA is performed on F2. In some cases the wireless transmission on F1 may be inhibited for a period that overlaps performance of the CCA on F2. In another example, the wireless transmission on F1 is inhibited during a first period, and the CCA is performed on F2 during a second period that at least partly overlaps the first period. In some cases, inhibiting the wireless transmission on F1 may include muting a portion of the wireless transmission on F1, such as during the first period. The first period may include an OFDM symbol of the wireless transmission on F1.

Alternatively, instead of muting the entire OFDM symbol, the UE can selectively mute subcarriers to minimize in-device interference experienced on F2. For example, subcarriers near the edge of the F1 frequency band that are nearest to F2 can be muted. As another example, at least a subset of subcarriers in one or more OFDM symbols of the wireless transmission on F1 can be muted.

While this figure describes the device as a UE, the techniques can also be used when the device is an infrastructure node such as a Wi-Fi access point, an eNB, or a small cell. For example, the device can be an infrastructure node that supports Wi-Fi operation on one or more carriers and LTE LAA operation on one or more carriers. The device can also be an infrastructure node that supports LTE LAA operation on two or more carriers.

If the device is a UE, the UE may determine a need to perform a CCA on F2 at a given time period by receiving a resource allocation for transmission on F2 during a transmission time slot immediately following the given time period. If the device is a base station, the base station may determine a need to perform a CCA on F2 at a given time period by receiving data for transmission to one or more UEs and scheduling the data for transmission during a transmission time slot immediately following the given time period.

In a related embodiment, both F1 and F2 may be LAA carriers. The device determines the time period when an LBT procedure has to be performed on F2. If there is an LAA transmission on F1 ongoing at the time of the LBT on F2, the device mutes the OFDM symbols on F1 that overlap the LBT duration. This enables the device to perform LBT and detect any transmissions from other devices on F2. If no ongoing transmissions on F2 are found by the LBT procedure, the device can transmit on F2. In some cases the wireless transmission on F1 and the wireless transmission on F2 at least partly overlap.

Embodiment 2

Figure 6:
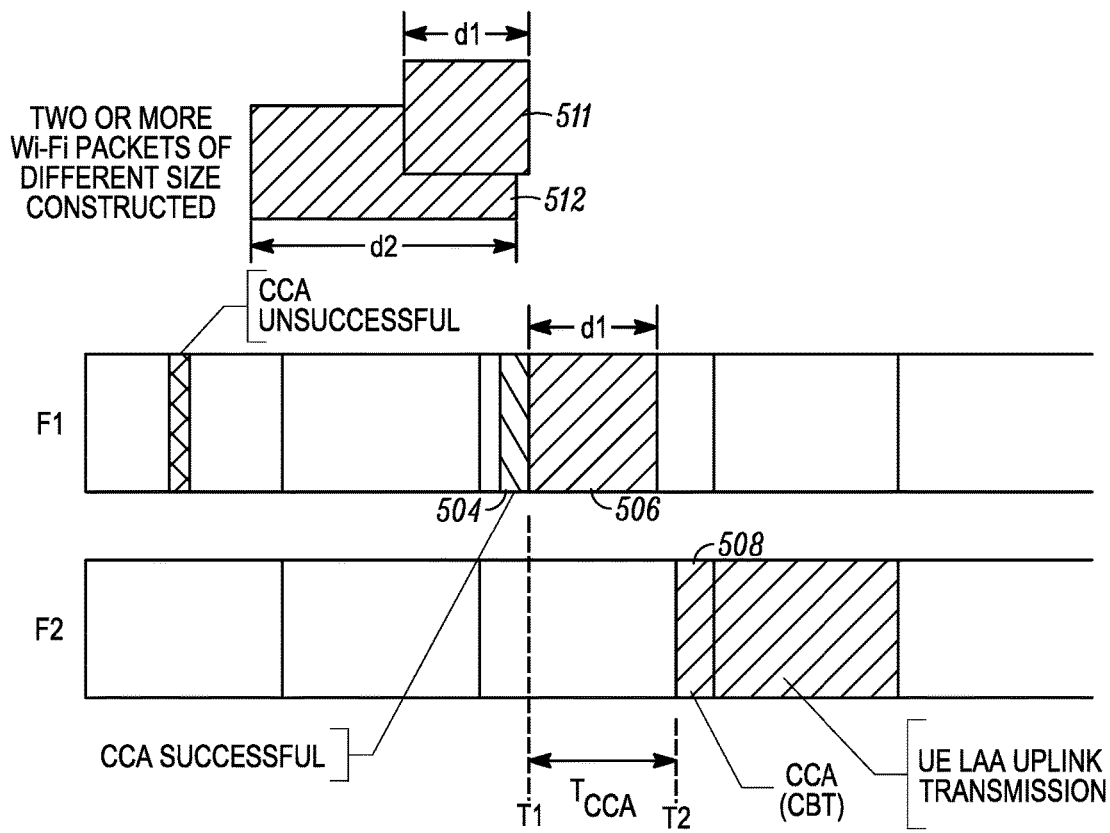
FIG. 6 illustrates an embodiment in which a device determines whether to transmit on one frequency based on the remaining time available before the next clear channel assessment on another frequency begins.

Referring now to FIG. 6, a second embodiment generally involves determining whether to transmit on F1 based on the remaining time available before the next CCA on F2 begins. When the device (e.g., UE) prepares to perform a Wi-Fi transmission on F1, it determines the time duration d needed for its packet transmission on F1. It then determines the time available $T_{CCA}$ before it has to commence the next CCA on F2.

Before performing Wi-Fi transmissions on F1, the device is required to first perform a CCA on F1. If the CCA 504 on F1 is successful, and if the device estimates that its Wi-Fi transmission on F1 will finish before the device's CCA operation 508 on F2, then the device performs the Wi-Fi transmission 506 on F1. Conversely, if the device estimates that its Wi-Fi transmission on F1 will be ongoing (and hence interfere) when the device is performing LBT on F2, then the device may choose to skip the Wi-Fi transmission on F1 until the LBT on F2 is completed. In other words, if the LBT (CCA 504) on F1 is successful, at a time T1 when d is less than $T_{CCA}$, then the device performs the Wi-Fi transmission 506 on F1. Otherwise Wi-Fi transmission is skipped (e.g., the CCA on F1 is delayed) until after the CCA 508 on F2 is complete.

As an enhancement, the device can construct two or more Wi-Fi MAC packets 511, 512 of different sizes from the data in its buffer, requiring time duration $d_1$, $d_2$, etc. If the CCA 504 on F1 succeeds, then the device determines that it can successfully transmit a Wi-Fi MAC packet of duration d before it has to perform CCA 508 on F2 (at time T2), and hence the device transmits on F1 a Wi-Fi MAC packet i for which $d_i \le T_{CCA}$, if such a packet has been constructed. In FIG. 6, packet transmission 506 corresponds to Wi-Fi MAC packet 511.

In an another alternative, if the UE determines that its Wi-Fi transmission on F1 is ongoing (and hence will interfere), the UE may delay performing CCA on F2 until the Wi-Fi transmission on F1 is completed, thereby avoiding the penalization of waiting for a random back-off time and increases in contention-window size for channel access which would otherwise be needed due to an unsuccessful CCA performed on F2 while Wi-Fi transmission is ongoing on F1.

This embodiment may also be seen as an example of coordinating a wireless transmission on F1 with performance of the CCA on F2, and further as an example where such coordination includes inhibiting the wireless transmission on F1 during a first period, and performing a CCA on F2 during a second period that at least partly overlaps the first period.

Embodiment 3

Figure 7:
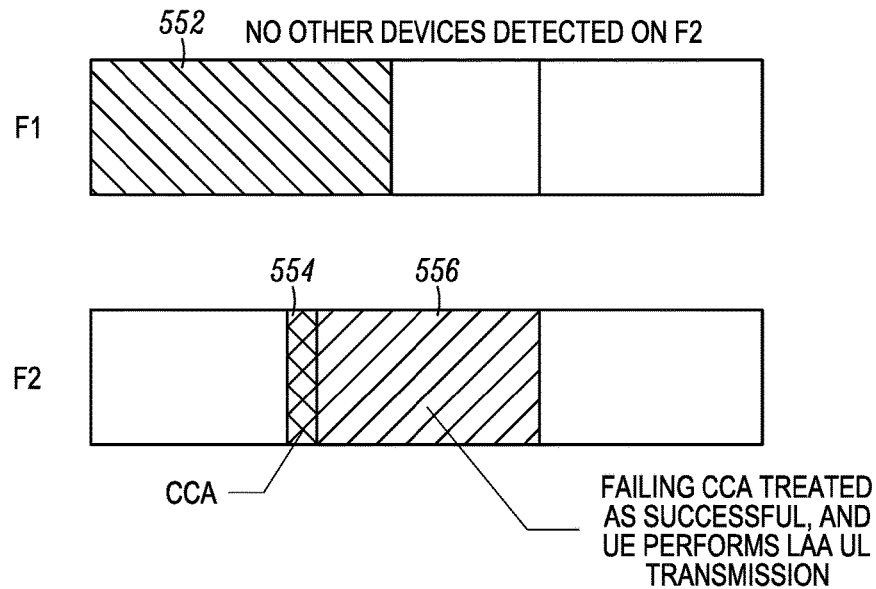
FIG. 7 illustrates an embodiment in which a device, which is transmitting on a first frequency, treats a clear channel assessment failure on a second frequency as a success in the absence of other detected nodes on the second frequency.

Referring now to FIG. 7, a third embodiment may be viewed as declaring CCA success based on absence of other nodes on carrier F2. For LAA operation the UE is configured to perform measurements of LAA eNBs on carrier F2. Additionally, given that LAA operates in bands that also support Wi-Fi, the UE can regularly perform scanning to find Wi-Fi beacons on carrier F2.

The absence of any other LAA eNBs (besides the one to which the UE is attached) or Wi-Fi APs on F2, implies that it is very likely that the only cause of CCA 554 failure on F2 is a Wi-Fi transmission 552 by the UE on F1 occurring during the time the UE is performing CCA 554 on F2. If there are no other LAA eNB or Wi-Fi APs detected on F2, when a CCA 554 failure is observed on F2 and the CCA period on F2 overlaps a Wi-Fi transmission 552 by the UE on F1, the UE may treat the CCA 554 on F2 as being successful, and proceed with transmission 556 on F2.

This approach has a (small) probability of collision. That is, if an LAA eNB or a Wi-Fi AP has just started operating on F2 (and has not been discovered by the UE), performs CCA at the same time as the UE and transmits its signal, it will collide with the UE's LAA uplink transmission 556. Technically, an approach in which the UE has not successfully passed CCA but still transmits may not be allowed in some regulatory domains. However, in practice the above scenario in which the UE has not detected a LAA eNB or Wi-Fi AP on the carrier and the LAA eNB or the Wi-Fi AP transmits at the same time as the UE would be rare. Signaling 'neighbor list' information by the network, can further minimize its occurrence. The neighbor list information indicates which LAA eNBs and Wi-Fi APs (i.e., "base stations" or infrastructure nodes) are operating on a given carrier frequency. This signaling can be performed using broadcast/dedicated signaling (e.g. on primary cell for LTE) or using Wi-Fi beacons or management frames.

Embodiment 4

Figure 8:
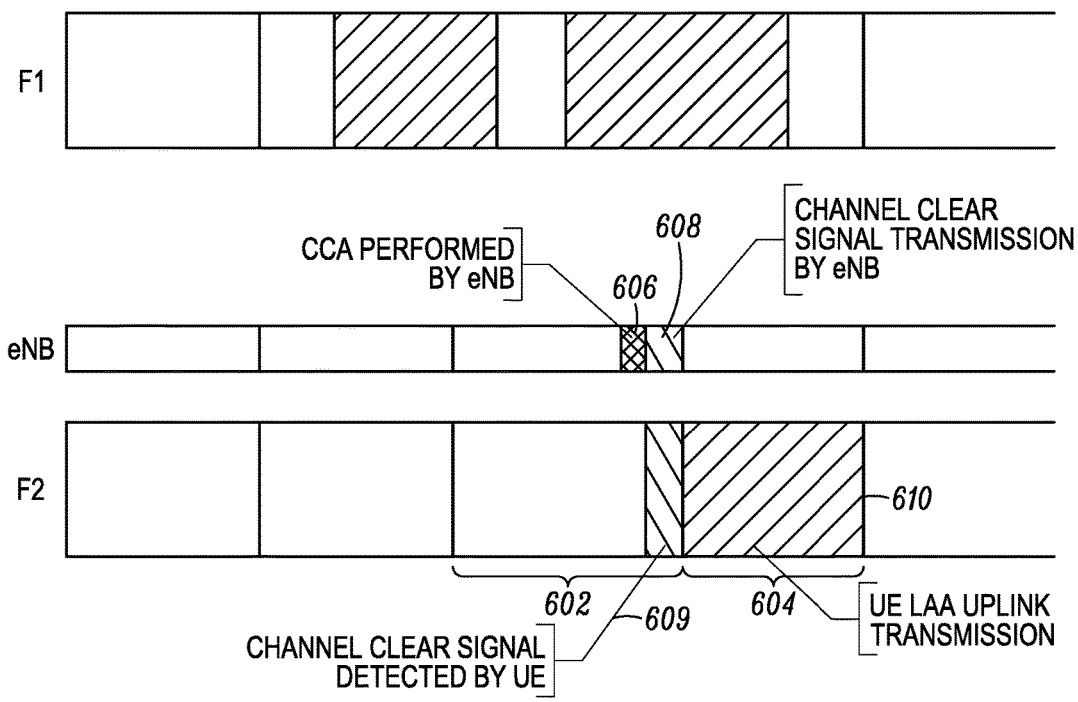
FIG. 8 illustrates an embodiment in which a device relies on an indication from another node that the channel can be used for uplink transmission.

Referring now to FIG. 8, a fourth embodiment generally provides that instead of the UE performing a CCA, the UE can rely on an indication from the eNB that the channel can be used for uplink transmission.

Initially, the eNB schedules an uplink transmission by a given UE in subframe n (labeled 604), by transmitting an uplink resource grant to the UE (e.g., an uplink resource grant is generally transmitted to the UE in subframe n-4 (not shown) for the UE's uplink transmission in subframe n).

Then, immediately prior to the start of subframe n (e.g., in the last OFDM symbol of subframe n-1 (labeled 602)), the eNB performs a CCA 606. If the CCA 606 is successful, the eNB transmits a 'Channel Clear' signal 608 to the UE. The UE listens for that clear channel signal 608, and if the UE receives the channel clear signal 608 (shown received or detected as 609) it proceeds to perform the scheduled LAA UL transmission 610 according to the earlier uplink grant. Conversely, if the UE does not receive a clear channel signal (such as when the CCA 606 at the eNB did not succeed), the UE skips the previously-scheduled LAA UL transmission.

The CCA 606 at the eNB and the subsequent transmission of the 'channel clear' signal 608 are performed in such a manner (e.g. contiguously) that no other device may acquire and perform transmissions on the channel before the UE begins its LAA UL transmission 610. The contiguous duration comprising the CCA 606 and the 'clear channel' signal 608 could occur in the last symbol of subframe n-1 (labeled 602), or a part of the contiguous duration could occur in the first symbol of subframe n (labeled 604). In the latter case, the subframe 604 for LAA UL transmission 610 may be shortened by one symbol.

It should be noted there could be regulatory restrictions that may not allow a device to transmit based on a CCA performed by another device, but if such a scheme can allow fair sharing of the medium, then it may be possible to allow such device behavior.

Embodiment 5

Figure 9A:
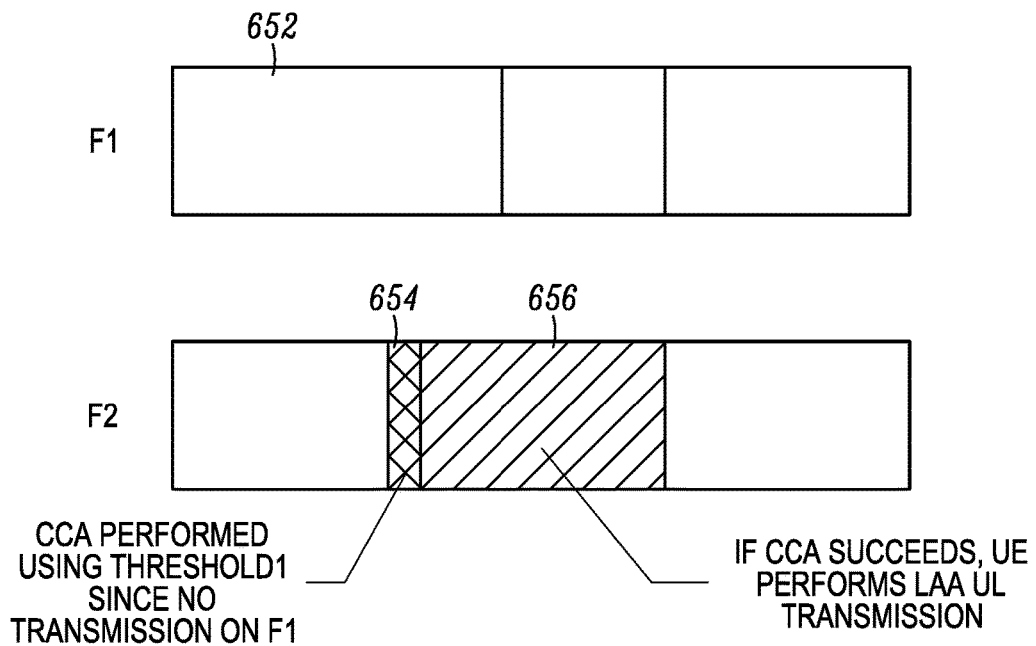
FIG. 9A illustrates an embodiment in which a device uses a first threshold when performing a clear channel assessment if that device is not transmitting on another frequency.
Figure 9B:
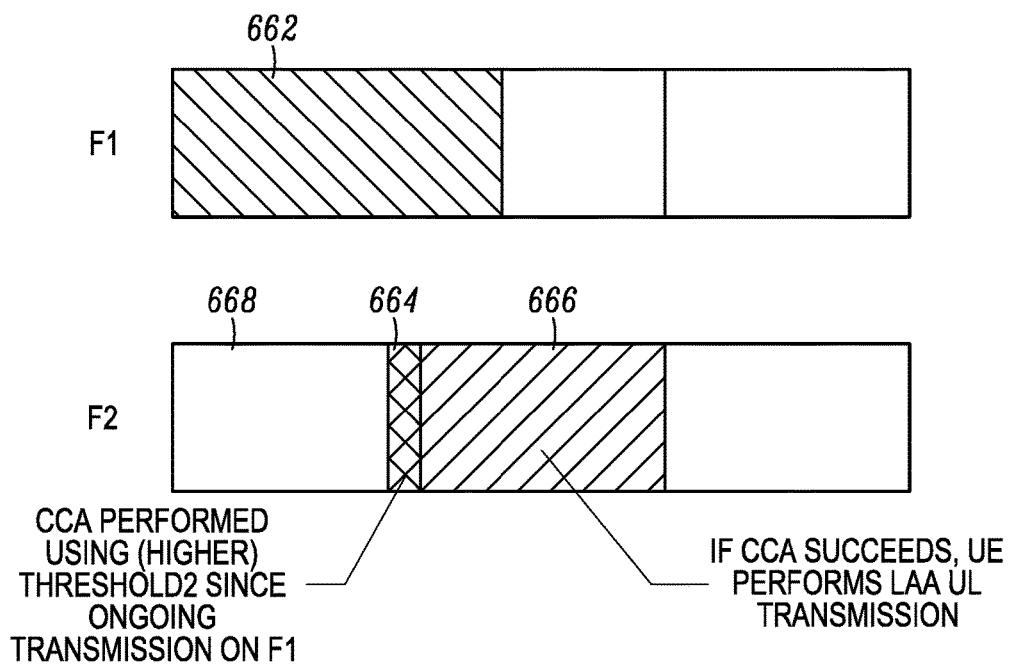
FIG. 9B illustrates an embodiment in which a device uses a second threshold when performing a clear channel assessment if that device is transmitting on another frequency.

Referring now to FIG. 9A, a fifth embodiment may also be seen as an example of coordinating a wireless transmission on F1 with performance of the CCA on F2. In this embodiment, such coordination generally involves adjusting the CCA threshold based on in-device interference. For example, if the UE determines that there is no simultaneous Wi-Fi transmission 652 on F1, it uses a first CCA threshold Thresh1 (e.g., −62 dBm) to determine whether F2 is available for UE transmission (i.e., if the detected energy is less than Thresh1, the CCA 654 is successful and the UE starts transmitting 656 on F2). However, as shown in FIG. 9B, if the UE determines that there is an ongoing Wi-Fi transmission 662 on F1, it uses a second CCA threshold Thresh2 (e.g., −52 dBm) to determine whether F2 is available for UE transmission. In this case, if the detected energy is less than Thresh2, the CCA 664 is successful and the UE starts transmitting 666 on F2.

Generally, Thresh2>Thresh1 so that during an ongoing Wi-Fi transmission 662 on F1 a higher detected power level on F2 may still result in a successful CCA 664. The difference between the Thresh2 value and the Thresh1 value may be static, may be preconfigured within the UE, may be dictated by the eNB, and may be determined dynamically.

For example, the UE can measure In-Device leakage during an idle slot 668 on F2 while there is Wi-Fi transmission 662 on F1. If the measured energy is X dBm, the UE can then set Thresh2'=Thresh1'+X' (where Thresh2', Thresh1', and X' are linear values of Thresh2, Thresh1 and X in dBm respectively). As a numerical example, assume Thresh1=−62 dBm (i.e., the CCA threshold when there is no in-device interference). Further assume that the measured value of X (i.e., the leakage power into F2 due to transmission on F1)=−52 dBm (assuming 18 dBm Wi-Fi transmission and isolation between F1 and F2 is 70 dB). As a result, Thresh2=−51.59 dBm (CCA threshold when in-device interference is present).

The UE can measure and store different leakage values for different frequencies that can interfere with F2, and use the appropriate threshold based on those leakage values.

Although the above examples describe adjusting the CCA threshold for LAA LTE channel access on F2 based on in-device interference from Wi-Fi transmission on F1, the converse could also be applied with adjusting the CCA-ED ("energy detect") threshold for Wi-Fi channel access on F1 based on in-device interference experienced from LAA LTE transmission on F2.

The UE relies on communication between the two modems (Wi-Fi and LTE) to determine the threshold to use. A single processing unit enabling sharing of such information between the two communication technologies may control the two modems. There could be a combo Wi-Fi/LTE solution. The UE's Wi-Fi implementation can provide Wi-Fi-related assistance information (e.g., detailed metrics related to Wi-Fi CCA, Request to send (RTS)/clear to send (CTS) information, or detected preamble/packet durations, its own Wi-Fi tx schedule, etc) to its LTE implementation, then the UE can adapt its CCA threshold for F2 based on such information. Conversely, the UE's LTE implementation may be able to provide assistance information to the Wi-Fi implementation to help with Wi-Fi performance improvement. For instance, unnecessary contention-window doubling for Wi-Fi may be avoided, if the UE knows its LTE implementation is contending with its own Wi-Fi implementation.

Embodiment 6—Partial Frequency Overlap

Assume a situation where F1 and F2 overlap partially, and the UE operates Wi-Fi on F1 and LAA DL (and possibly LAA UL) on F2. The Wi-Fi transmission on F1 can make reception of LAA DL transmissions on F2 very difficult.

Given the partial overlap, a CCA procedure on F1 can potentially detect a transmission by an eNB on F2. That is, if the received signal of an eNB on F2 is strong enough, the energy detected in the overlapped portion of the frequency can cause the CCA on F1 to be unsuccessful. Conversely, if the received signal of an eNB on F2 is weak, the energy detected in the overlapped portion of the frequency may be low enough that the CCA on F1 is successful. However, the UE's subsequent Wi-Fi transmissions on F1 may interfere with the UE receiving such weak LAA DL transmissions on F2.

Consequently, it may be desirable to use only such "strong" LAA eNBs on F2 so that, if the UE performs a CCA on F1 when the "strong" eNB is transmitting on F2, the CCA on F1 is unsuccessful, and the UE will forego transmission on F1. This prevents a UE from "latching onto" weak transmissions on F2 when the UE's subsequent transmissions on F1 would interfere with the UE receiving the weak transmissions on F2. At the UE, choosing of acceptable eNBs may be done based on a Reference Signal Receive Power (RSRP) threshold.

For example, the UE can determine the lowest LAA eNB RSRP level on F2 that would correspond to a CCA failure declaration on F1, and uses this as an RSRP threshold. That is, the RSRP threshold is such that if the RSRP (measured at the UE) of an eNB is higher than the threshold, the energy in the eNB's signal is high enough to cause the CCA on F1 to fail, thus preventing overlapping transmissions by the UE on F1. Conversely, if the RSRP of an eNB is lower than the threshold, the energy in the eNB's signal is too low to cause the CCA on F1 to fail. In response to such a "successful" CCA, the UE's Wi-Fi modem would then transmit a Wi-Fi signal on F1, which would interfere with the UE's ability to receive the LAA DL from the eNB.

In an another alternative, if the RSRP of an eNB is lower than the threshold, the UE may delay performing CCA (or delay transmitting) on F1 until after the end of the transmission burst of the eNB, e.g., in the eNB idle period due to regulatory discontinuous transmission requirements and when the eNB is not transmitting on the Scell. The eNB may signal the occurrence of the transmission burst and the transmission burst duration on Pcell or in preamble transmission on the Scell at the beginning of the transmission burst.

Figure 10A:
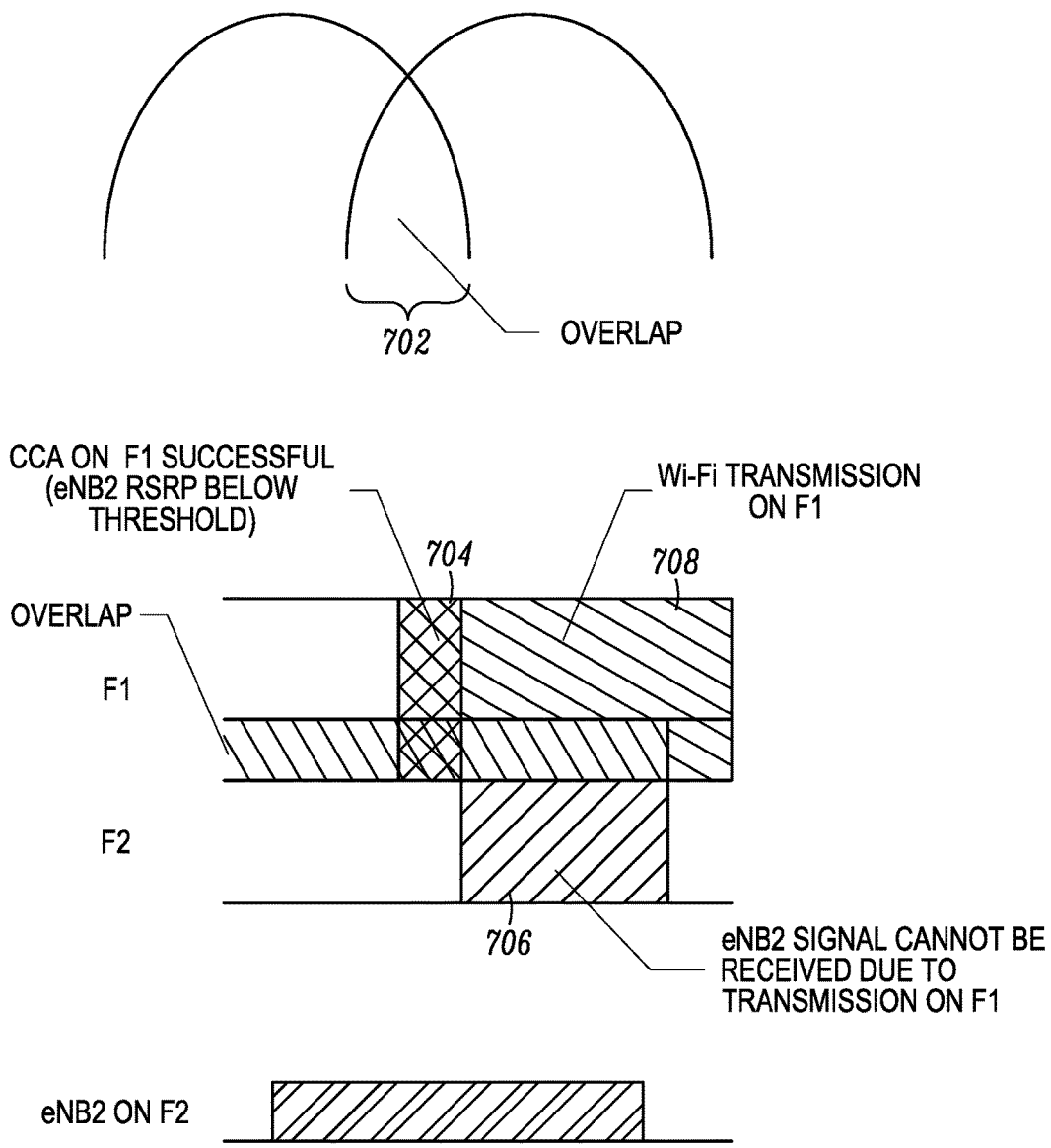
FIG. 10A illustrates a partial frequency overlap case in which a clear channel assessment performed on a first channel may not detect a weak transmission on a second channel by another device, and the subsequent transmission on the first channel results in the inability to continue to receive the weak transmission on the second channel.

Referring now to FIG. 10A, F1 and F2 represent the two frequencies with a partial overlap 702. An RSRP measurement threshold is selected for eNBs on F2, such that if the RSRP measurement of an eNB is higher than the threshold, the CCA procedure on F1 fails. An eNB1 and eNB2 are shown, with the eNB1 assumed to be much closer to the UE than the eNB2, so that the RSRP of eNB1 is above the threshold and the RSRP of eNB2 is below the threshold. If a CCA 704 is performed on F1, the CCA 704 succeeds even if eNB2 is transmitting 706 (assuming no other transmissions on F1). Because of the successful CCA 704, the UE would normally then perform a Wi-Fi transmission 708 on F1 which impacts the reception by the UE of the eNB2's transmission 706 on F2.

Figure 10B:
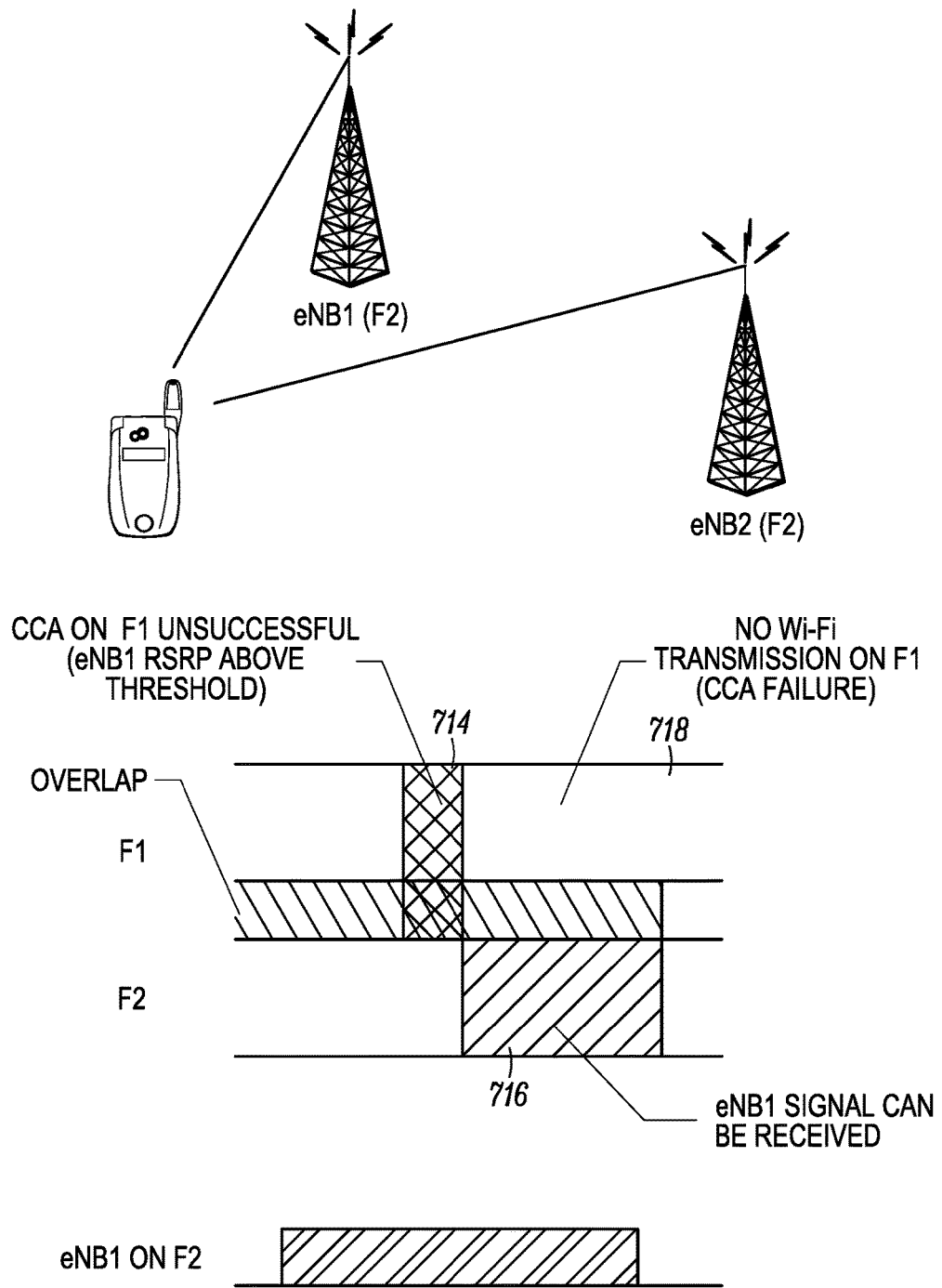
FIG. 10B illustrates a partial frequency overlap case in which a clear channel assessment performed on a first channel detects a transmission on a second channel by another device, and causes the device to forego transmission on the first channel, to thereby continue to receive the transmission on the second channel.

Referring to FIG. 10B, if eNB1 is transmitting instead of eNB2, the CCA 714 on F1 fails and the UE does not perform the Wi-Fi transmission 718 on F1. This allows the UE to continue to receive the eNB1's transmission 716 on F2. Consequently the UE can take actions to ensure that it is not expected to receive transmissions from eNB2. Such actions can include signaling to the network that eNB2's signal is below an acceptable level. The network can then configure only acceptable eNBs for data transmission, such as eNB1. If the RSRP of a given eNB falls below the RSRP threshold, the UE can request the network to not transmit at least some data signals (e.g., LAA DL signals) to the UE from the given eNB. The RSRP threshold may be pre-configured or may be determined in real time, for example based on RSRP measurements, CCA measurements and correlation between the two.

Embodiment 7—Full Frequency Overlap

If both LAA and Wi-Fi are operating on the same carrier, in case of conflict, a UE could choose to drop one or the other tx/rx based on the packet type each radio access technology (RAT) is carrying (e.g., VoIP or TCP A/N may be prioritized over FTP).

A UE operating Wi-Fi and LAA on the same carrier needs to be capable of performing CCA on the carrier according to the Wi-Fi specification requirements and performing CCA on the carrier according the LAA specification requirements. The UE may be able to cooperatively use the two CCA mechanisms.

In one example, if both the CCAs are based on carrier-sense, the UE can consider Wi-Fi CCA to be successful if LAA CCA is successful, and vice versa. If both the CCAs are based on energy detection, the UE can determine which one of the Wi-Fi and LAA CCA has the more stringent energy threshold (i.e., the lower threshold). If the CCA with the more stringent threshold is successful, the other CCA can also be considered to be successful.

In another example, if a UE gets an eNB indication that the eNB would like to use a 4 ms duration for LAA-uplink (for scheduling other UEs), the UE can delay its Wi-Fi CCA for those 4 ms.

While some of the description (and corresponding figures) of techniques presented above may be described in the context of a UE device, the techniques can also be used when the wireless communication device is an infrastructure node (i.e., base station) such as a Wi-Fi access point, an eNB or a small cell. For example, the wireless communication device can be an infrastructure node that supports Wi-Fi operation on one or more carriers and LTE LAA operation on one or more carriers. The wireless communication device can also be an infrastructure node that supports LTE LAA operation on two or more carriers.

The various techniques described above are contemplated to be used alone or in combination. In addition, while methods and techniques are generally described above, various wireless communication devices (such as, for example, UE's and eNB's) and systems that are operable to perform such methods and techniques are also contemplated.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the scope of the invention as defined by the claims in this application or in any application claiming priority to this application. Thus, it is intended that such claims be interpreted to embrace all such further modifications, changes, rearrangements, substitutions, alternatives, design choices, and embodiments.

What is claimed is:

1. A method for a wireless communication device to perform wireless transmissions of a first technology on a first carrier and a second technology on a second carrier, said method comprising:
   determining, by the wireless communication device, a need to perform a clear channel assessment (CCA) on the second carrier;
   coordinating, by the wireless communication device, a wireless transmission on the first carrier with performance of the CCA on the second carrier, wherein the coordinating comprises controlling, by the wireless communication device, coexistence interference by the wireless transmission on the first carrier to be below a threshold during at least a time period corresponding to the performance of the CCA on the second carrier; and
   commencing, by the wireless communication device, a wireless transmission on the second carrier if the CCA on the second carrier is successful.

2. The method as in claim 1 wherein:
   the wireless communication device is a user equipment (UE).

3. The method as in claim 1 wherein:
   the wireless communication device is a base station.

4. The method as in claim 1 wherein said coordinating comprises:
   inhibiting wireless transmission on the first carrier during a first period; and
   performing a CCA on the second carrier during a second period, wherein the second period at least partly overlaps the first period.

5. The method as in claim 4 further comprising:
   commencing, by the wireless communication device, a wireless transmission on the first carrier before performing the CCA on the second carrier;
   wherein said inhibiting comprises muting a portion of the wireless transmission on the first carrier for the first period.

6. The method as in claim 5 wherein the first period is an orthogonal frequency-division multiplexed (OFDM) symbol of the wireless transmission on the first carrier.

7. The method as in claim 5 wherein said muting a portion of the wireless transmission comprises muting selected subcarriers of the wireless transmission on the first carrier.

8. The method as in claim 5 wherein said muting a portion of the wireless transmission comprises muting at least a subset of subcarriers in one or more OFDM symbols of the wireless transmission on the first carrier.

9. The method as in claim 5 wherein the wireless transmission on the first carrier and the wireless transmission on the second carrier at least partly overlap.

10. The method as in claim 5 wherein:
    the wireless communication device is a user equipment (UE); and
    said determining a need to perform a clear channel assessment on the second carrier comprises receiving a resource allocation for transmission on the second carrier during a transmission time slot immediately following the second period.

11. The method as in claim 5 wherein:
    the wireless communication device is a base station; and
    said determining a need to perform a CCA on the second carrier comprises receiving data for transmission to one or more UEs and scheduling the data for transmission during a transmission time slot immediately following the second period.

12. The method as in claim 4 wherein said inhibiting comprises:
    determining, by the wireless communication device, a first amount of time required for transmission of a first packet on the first carrier;
    determining, by the wireless communication device, a time at which a CCA on the second carrier is to be performed;
    performing, by the wireless communication device, a CCA on the first carrier; and
    transmitting, by the wireless communication device, the first packet on the first carrier if the CCA on the first carrier is successful and if at least the first amount of time remains before the time at which the CCA on the second carrier is to be performed.

13. The method as in claim 12 wherein said inhibiting further comprises:
    delaying, by the wireless communication device, the CCA on the first carrier if transmitting the first packet on the first carrier would overlap with performing the CCA on the second carrier.

14. The method as in claim 12 further comprising:
    determining, by the wireless communication device, a second amount of time required for transmission of a second packet on the first carrier; and
    transmitting, by the wireless communication device, the second packet on the first carrier if at least the second amount of time remains before the time at which the CCA on the second carrier is to be performed.

15. The method as in claim 12 wherein:
    the wireless communication device is a user equipment (UE).

16. The method as in claim 12 wherein:
    the wireless communication device is a base station.

17. The method as in claim 4 wherein said inhibiting comprises:
    determining, by the wireless communication device, a first time duration needed for transmission of a packet on the first carrier, and a second time duration before beginning a CCA on the second carrier;
    performing, by the wireless communication device, a CCA on the first carrier;

transmitting, by the wireless communication device, if the CCA on the first carrier is successful before the expiration of a third duration equal to the second time duration minus the first time duration, the packet on the first carrier; and delaying, by the wireless communication device, if the CCA is not successful before the expiration of the third duration, a transmission of the packet on the first carrier at least until the CCA on the second carrier is complete.

18. The method as in claim 17 further comprising:

constructing, by the wireless communication device, two or more packets for transmission on the first carrier; and wherein said transmitting the packet on the first carrier comprises:
  selecting, by the wireless communication device, a first packet from the two or more packets such that the first time duration corresponding to the first packet is no greater than the second time duration; and
  transmitting, by the wireless communication device, the first packet on the first carrier.

19. The method as in claim 1 wherein said coordinating comprises:
  performing, by the wireless communication device, a CCA on the second carrier using a first threshold value if the wireless communication device is not simultaneously transmitting on the first carrier, and using a second threshold value if the wireless communication device is simultaneously transmitting on the first carrier.

20. The method as in claim 19 wherein the magnitude of the second threshold is greater than the magnitude of the first threshold.

21. The method as in claim 20 wherein a difference in magnitude between the second threshold and the first threshold is dictated by a base station.

22. The method as in claim 20 wherein a difference in magnitude between the second threshold and the first threshold is determined by the wireless communication device by measuring in-device leakage during an idle slot on the second carrier during a transmission by the wireless communication device on the first carrier.

23. The method as in claim 22 further comprising:
  measuring, by the wireless communication device, corresponding in-device leakage during an idle slot on the second carrier during a transmission by the wireless communication device on the first carrier, for each respective one of a plurality of first carrier frequencies; and
  selecting, by the wireless communication device, the second threshold value for use during a transmission on a given first carrier frequency, based on the measured in-device leakage for the given first carrier frequency.

24. A wireless communication device (WCD) configured to perform wireless transmissions of a first technology on a first carrier and a second technology on a second carrier, said WCD comprising:
  a transceiver;
  a processor coupled to the transceiver;
  wherein the WCD is operable to:
    perform a clear channel assessment (CCA) on the first carrier;
    commence a wireless transmission on the first carrier if the CCA on the first carrier is successful;
    determine a need to perform a CCA on the second carrier;
    coordinate wireless transmission on the first carrier with performance of the CCA on the second carrier, wherein the coordinating comprises controlling, by the WCD, coexistence interference by the wireless transmission on the first carrier to be below a threshold during at least a time period corresponding to the performance of the CCA on the second carrier; and
    commence a wireless transmission on the second carrier if the CCA on the second carrier is successful.

25. The wireless communication device as in claim 24 wherein:
  the wireless communication device is a user equipment (UE).

26. The wireless communication device as in claim 24 wherein:
  the wireless communication device is a base station.

* * * * *